United States Patent
Lillevold

[19]

[11] Patent Number: 5,880,784
[45] Date of Patent: Mar. 9, 1999

[54] METHOD AND APPARATUS FOR ADAPTIVELY SWITCHING ON AND OFF ADVANCED PREDICTION MODE IN AN H.263 VIDEO CODER

[75] Inventor: Karl O. Lillevold, Hillsboro, Oreg.

[73] Assignee: Intel Corporation, Santa Clara, Calif.

[21] Appl. No.: 877,541

[22] Filed: Jun. 17, 1997

[51] Int. Cl.[6] .............................. H04N 7/36; H04N 7/50
[52] U.S. Cl. ......................... 348/404; 382/236; 382/239
[58] Field of Search .................................. 348/420, 404; 382/236, 239; H04N 7/36, 7/50

[56] References Cited

U.S. PATENT DOCUMENTS 5,748,789 5/1998 Lee ............................................ 382/243
5,764,803 6/1998 Jacquin ..................................... 382/236

*Primary Examiner*—Howard Britton
*Attorney, Agent, or Firm*—Blakely, Sokoloff, Taylor & Zafman LLP

[57] ABSTRACT

A feedback mechanism for adaptively enabling and disabling an advanced prediction mode for video data processing is disclosed. A quantization parameter (QP) threshold is set and a QP mean for an error frame is determined. The advanced prediction mode is enabled if the QP mean is less than the QP threshold.

12 Claims, 5 Drawing Sheets

METHOD AND APPARATUS FOR ADAPTIVELY SWITCHING ON AND OFF ADVANCED PREDICTION MODE IN AN H.263 VIDEO CODER

BACKGROUND OF THE INVENTION (1) Field of the Invention

The present invention is related to the field of video coding, more specifically, the present invention is a method and an apparatus for adaptively enabling and disabling the advanced prediction mode in an H.263 video coder.

(2) Related Art

The International Telecommunication Union (ITU) Telecommunication Standardization Sector H.263 standard (ITU-T std. H.263-1995, published March 1996) is a standard for a coded representation which can be used for compressing the moving picture component of audio-visual services at low bit rates. The coding algorithm of the H.263 is a hybrid of inter-picture prediction which utilizes temporal redundancy, and transform coding of the remaining signal to reduce spatial redundancy.

There are numerous different optional modes in H.263 including an advanced prediction mode. In this mode, overlapped block motion compensation (OBMC) is utilized for the luminescence portion of P-pictures. Four 8 by 8 vectors are used instead of one 16 by 16 vector for the sum of the macro-blocks in a given picture. The tradeoff is that 4 vectors utilize more bits but produce better prediction. The use of this mode generally provides a considerable improvement because OBMC results in decreased blocking artifacts.

There are various trade-offs in selecting an optional mode provided by H.263. Because the modes are optional, it is not necessary for the decoder to support any of the optional modes. If a decoder supports a given mode, the encoder has the option to enable or disable that given mode.

Currently few methods exist for determining whether to enable or disable an optional mode for H.263. Typically, an optional mode is enabled at the beginning of a video data sequence and stays on throughout the entire length of the video data sequence. The disadvantage of this method is that with some types of video, the optional mode results in decreased video quality. For other types of video, the increase in video quality does not justify the increase in the computational overhead associated with the optional mode being enabled.

Therefore a method and an apparatus are desirable for allowing a feedback mechanism to determine whether to enable or disable an optional mode to produce the best video quality given a video data sequence.

BRIEF SUMMARY OF THE INVENTION

A method and an apparatus for adaptively activating an advanced prediction mode of a video coder for video data processing are disclosed. A quantization parameter (QP) threshold is set and a QP mean for an error frame for a first frame is determined. The advanced prediction mode for a second frame is activated if the QP mean for the first frame is greater than the QP threshold.

DETAILED DESCRIPTION OF THE INVENTION

H.263 is a coded representation which can be used for compressing the moving picture component of audio-visual services at low bit rates. The coding algorithm of the H.263 is a hybrid of inter-picture prediction which utilizes temporal redundancy and transform coding of the remaining signal to reduce spatial redundancy.

H.263 has an advanced prediction mode in which overlapped block motion compensation (OBMC) is utilized for the luminescence portion of P-pictures. Four 8 by 8 vectors instead of one 16 by 16 vector are used for the sum of the macro-blocks in the picture. The use of this mode generally provides a considerable improvement due to decreased blocking artifacts.

The present invention provides a method and apparatus for adaptively switching on and off the advanced prediction optional mode in an H.263 video coder.

Figure 1:
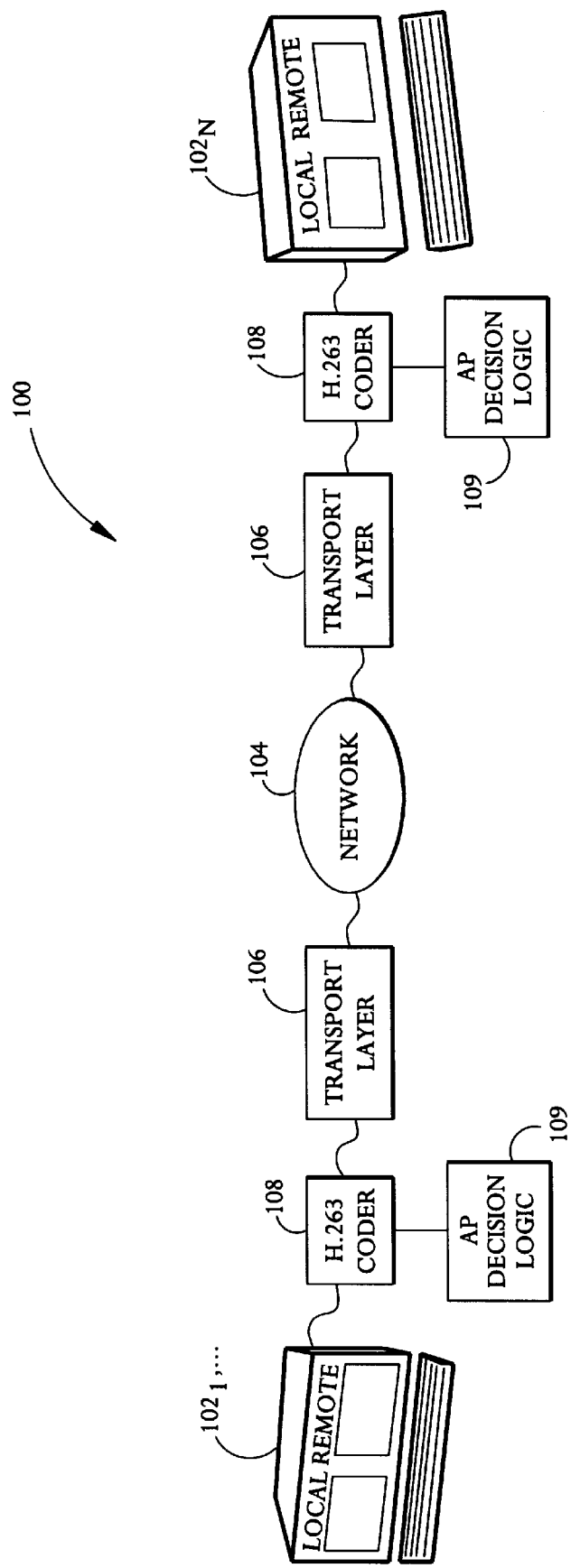
FIG. 1 is an exemplary system with the present invention's advanced prediction decision logic.

FIG. 1 is an exemplary system with the present invention's advanced prediction decision (AP) logic. Video conferencing system 100 is coupled to a plurality of computer systems $102_1$ through $102_N$ through a network 104. Network 104 may for example be a public switched telephone network (PSTN), a local area network (LAN) or an internet. Each computer system 102 communicates with other systems in network 104 through transport layer 106.

Through video coder 108 implemented with the present invention's AP decision logic 109, video data received through network 104 may be displayed to computer system 102 with the best possible video quality. AP decision logic 109 of the present invention takes the average sum of the quantization parameter (QP) value of each macroblock in a given video frame and averages that sum to produce a QP mean. A QP mean as used herein is the mean quantization parameter for a previous frame. If the QP mean is greater than a predetermined QP threshold, the advanced prediction mode on video coder 108 is turned on.

The present invention's AP decision logic may be used in any system for processing video data sequence in configuration with a video coder such as in the exemplary video conferencing system illustrated in FIG. 1.

Figure 2A:
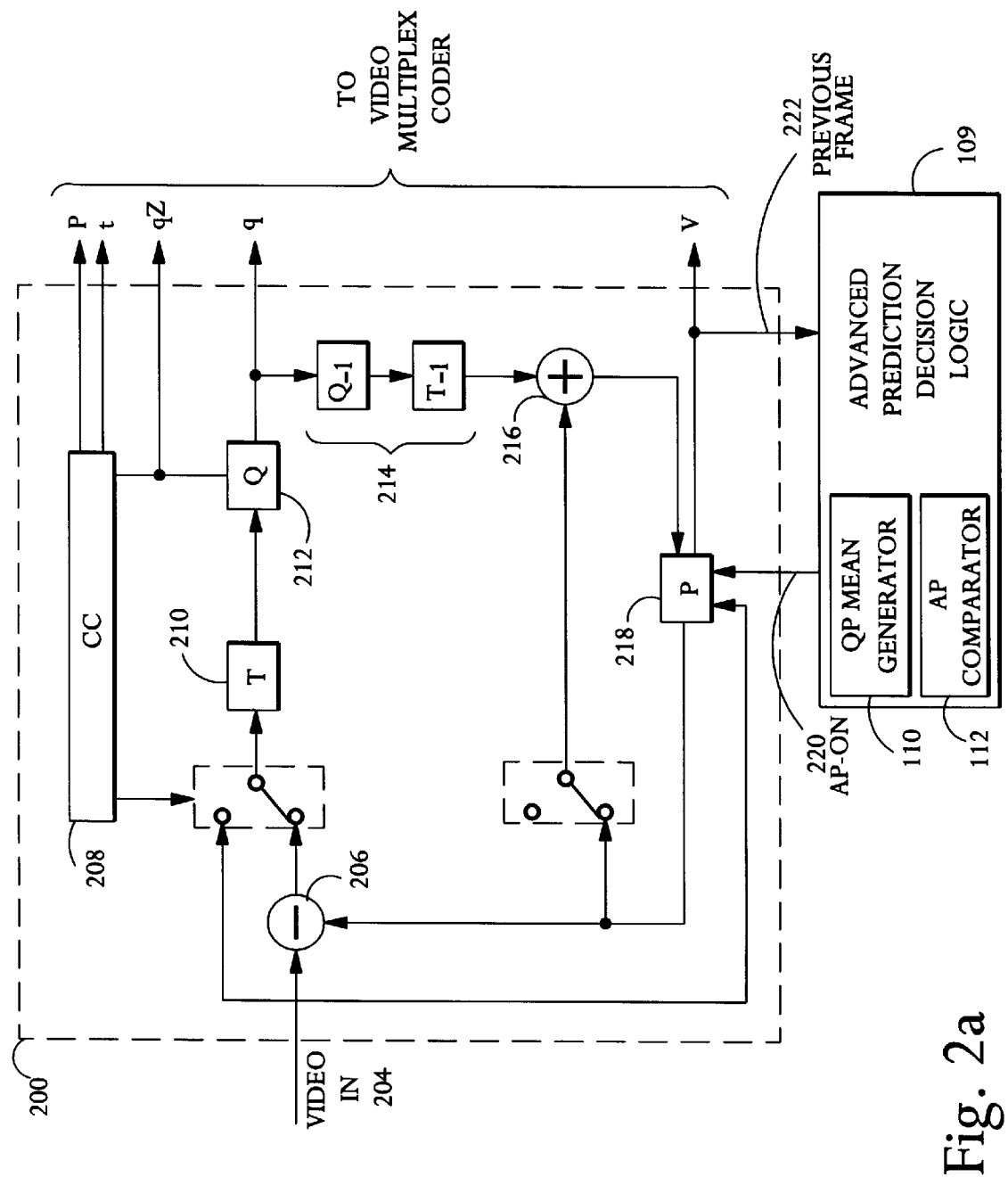
FIG. 2a illustrates an exemplary source coder coupled to the present invention's advanced prediction decision logic.

FIG. 2a illustrates an exemplary source coder coupled to the present invention's advanced prediction decision logic. H.263 coder 200 (coder) is coupled to AP decision logic 109. Video signal 204 is accepted by coder 200 and may be processed by subtraction logic 206 as indicated by coding control 208. The subtraction logic computes motion vectors by subtracting frames that are temporally related and is well known in the art. The signal is then transformed through discrete cosine transform (DCT) 210 into the frequency domain, quantized by quantizer 212 and provided to a video multiplex processor. The same frame is processed through inverse quantization ($Q^{-1}$), inverse DCT ($T^{-1}$) 214 and by addition logic 216 and stored in picture memory 218 with motion compensated variable delay. The addition logic adds motion vectors to a reference frame to recover an actual frame and is well known in the art.

AP decision logic 109 receives a previous frame 222 from coder 200. AP decision logic 109's QP mean generator 110 then determines the QP mean for the given frame. AP decision logic 109's AP comparator 112 compares the QP mean with a predetermined QP threshold and if the QP mean is greater than a predetermined QP threshold, then the AP mode is to be turned on. Accordingly, AP decision logic 109 signals coder 200 with AP signal 220 indicating whether AP optional mode is to be turned on. Responsive to AP signal 220, coder 200 turns on the AP optional mode for the video frame most recently received for processing.

Figure 2B:
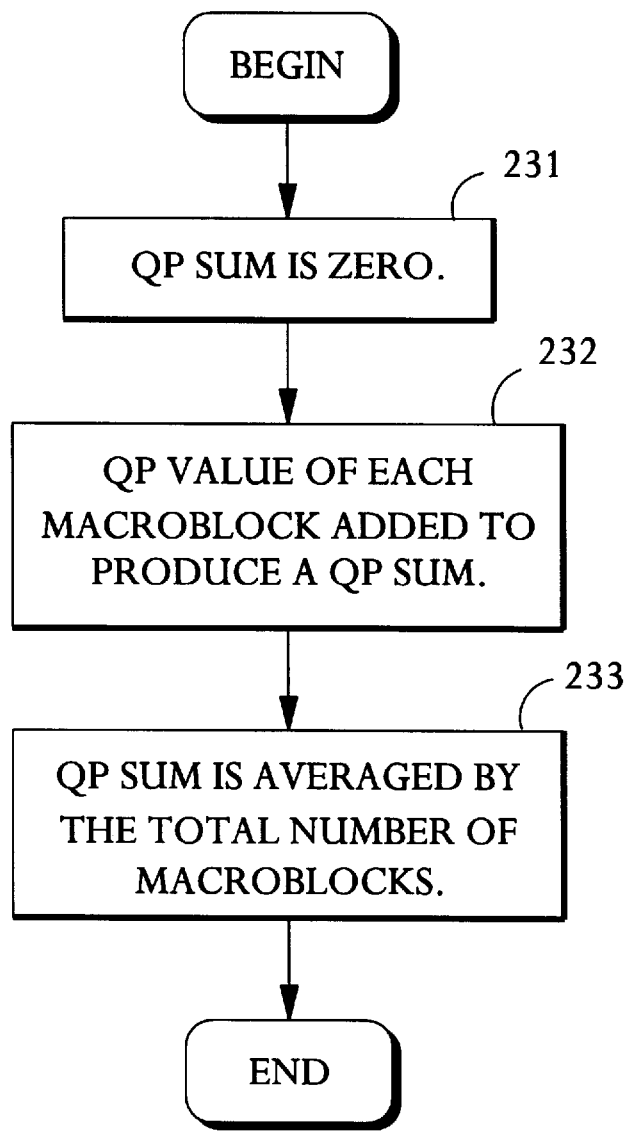
FIG. 2b is a flow diagram illustrating the general steps followed by the present invention's QP mean generator.

FIG. 2b is a flow diagram illustrating the general steps followed by the present invention's QP mean generator. In step 231, a QP sum has an initial state of zero. In step 232, QP values for each macro-block in a given frame are added to produce a new QP sum. In step 233, the new QP sum is then averaged by the total number of macro-blocks in the given frame to produce a QP mean for the given frame.

Figure 2C:
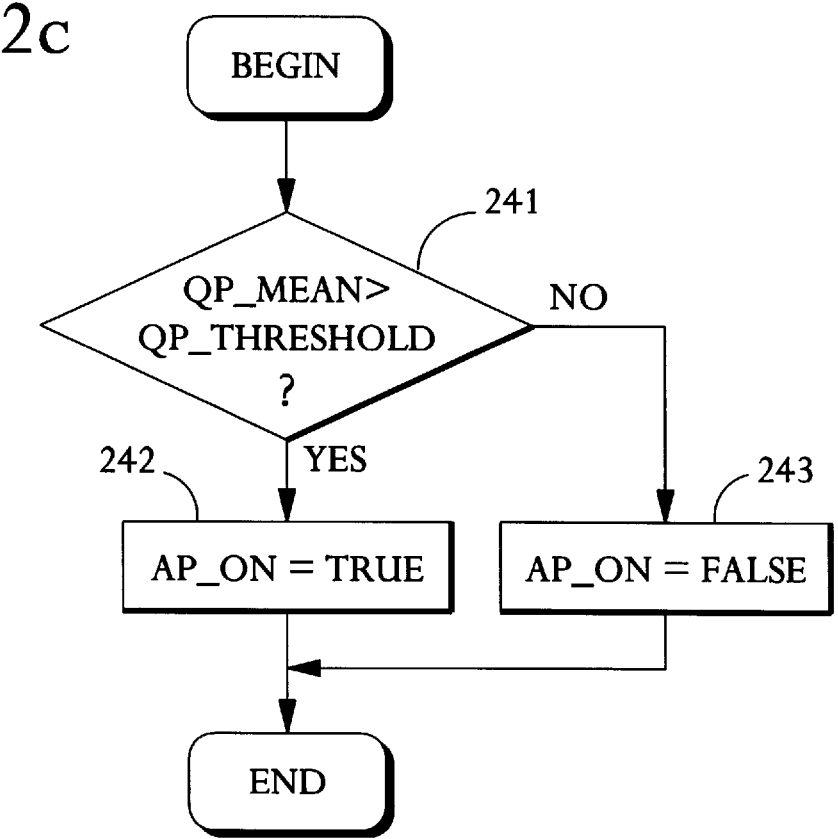
FIG. 2c is a flow diagram illustrating the general steps followed by the present invention's AP comparator.
Figure 3:
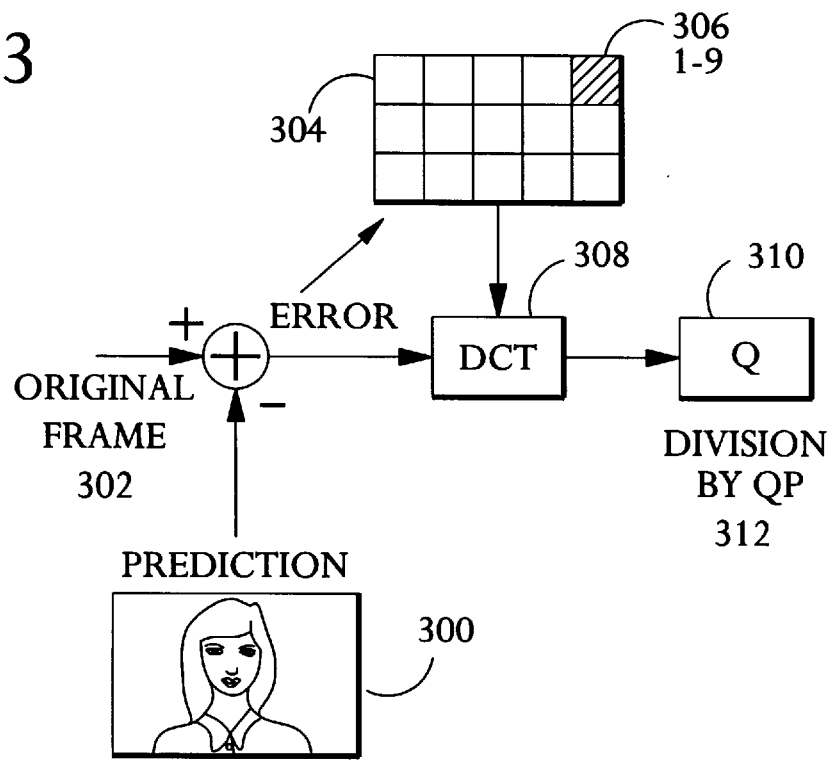
FIG. 3 illustrates the exemplary process flow of video frames processed by the present invention.

FIG. 2c is a flow diagram illustrating the general steps followed by the present invention's AP comparator. Given the QP mean as produced and described in FIG. 2b, in step 241, if the QP mean is greater than a predetermined QP threshold, then in step 242, the AP optional mode is turned on. Otherwise in step 243, the AP optional mode is turned off.

Figure 4:
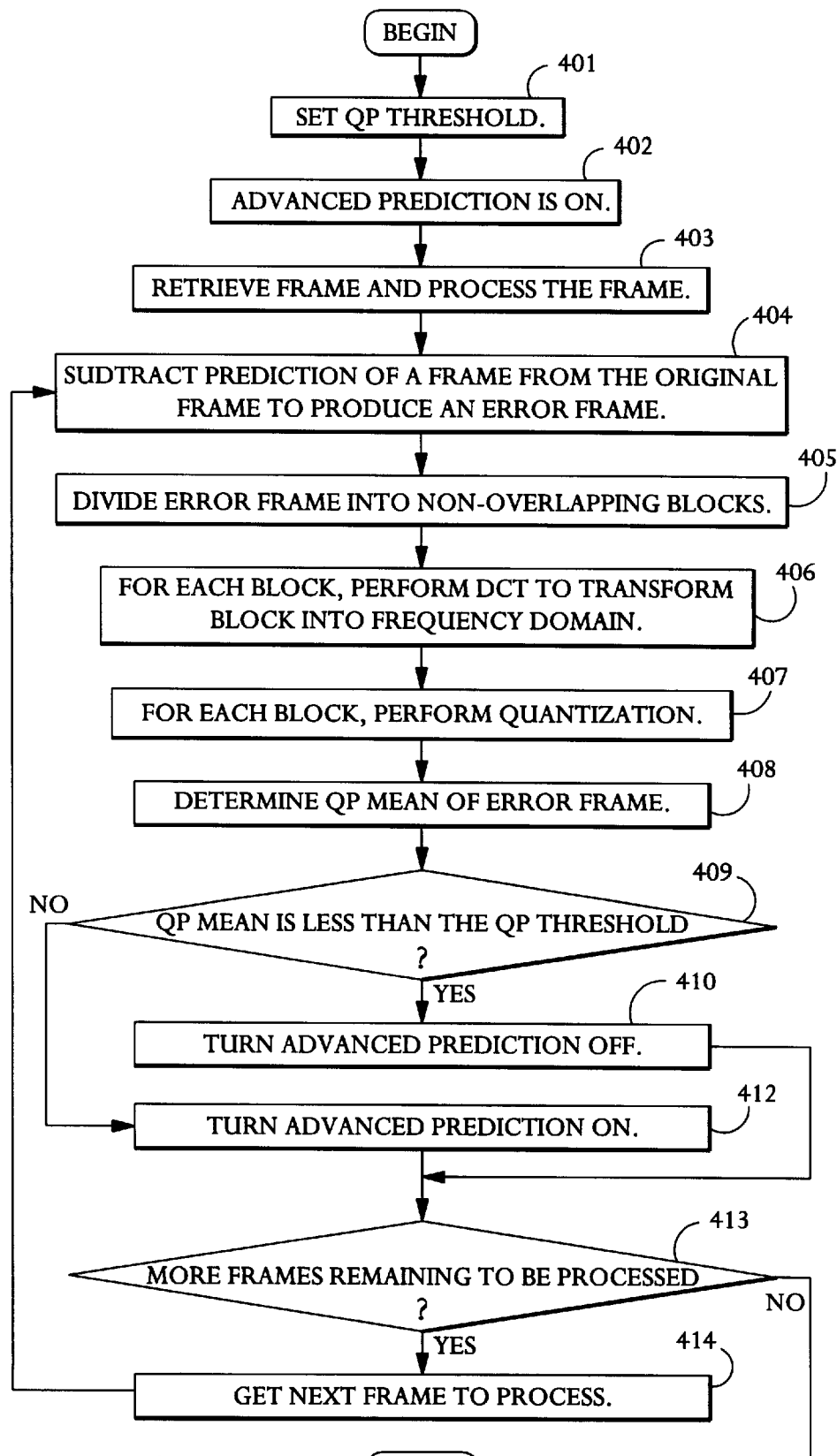
FIG. 4 is a flow diagram illustrating the general steps followed by the present invention.

FIG. 4 is a flow diagram illustrating the general steps followed by the present invention. In step 401, a QP threshold is set by a software designer. The QP threshold is a limit which switches the AP optional mode on if the QP mean is greater than this value. In step 402, AP optional mode is initially set to on. In step 403, a video frame (i.e. video signal) is received and processed. In step 404, a prediction of the frame is subtracted from the original frame to produce an error frame. In step 405, the error frame is then divided into non-overlapping blocks.

In step 406, a DCT is performed on each block to transform the blocks into the frequency domain. In step 407, quantization is performed on each block. In step 408, the QP mean of the error frame is determined as was described in FIG. 2b. In step 409, if the QP mean is less than or equal to a predetermined QP threshold, the AP optional mode is turned off in step 410. Otherwise, if the QP mean is greater than the QP threshold, then in step 412 the AP optional mode is turned on.

The activation of the AP optional mode is signaled to the coder indicating that advanced prediction is to be used to encode the next frame. In step 413, if there are more frames remaining to be processed, then in step 414 the next frame to be processed is retrieved and the entire process is repeated beginning from step 404.

What has been described is a method and an apparatus for adaptively enabling and disabling the advanced prediction mode in an H.263 video coder. A predetermined value for a QP threshold is set. The QP threshold is a limit which switches the AP optional mode on if the QP mean is greater than this value. A QP mean for an error frame is determined and the AP optional mode is enabled if the QP mean is greater than the QP threshold.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for adaptively activating an advanced prediction mode of a video coder for video data processing comprising the steps of:
   setting a predetermined quantization parameter (QP) threshold;
   determining a QP mean of an error frame for a first frame; and
   activating the advanced prediction mode on the video coder for a second frame if said QP mean is greater than said QP threshold.

2. The method of claim 1 wherein said step of determining said QP mean further comprises the step of adding QP values for each macroblock for said first frame to produce a QP sum for said first frame.

3. The method of claim 2 further comprising the step of averaging said QP sum by the total number of macroblocks in said first frame to produce a QP mean for said first frame.

4. The method of claim 1 wherein said step of activating further comprises the step of comparing said QP mean for said first frame with said predetermined QP threshold.

5. An apparatus for adaptively enabling and disabling an advanced prediction (AP) mode of a video coder for video data processing comprising:
   a quantization parameter (QP) mean generator for generating a QP mean for a first frame; and
   an AP comparator coupled to said OP mean generator, said AP comparator for comparing said QP mean with a predetermined QP threshold, said AP mode is turned on if said QP mean is greater than said predetermined QP threshold, and said AP mode is turned off if said QP mean is less than or equal to said predetermined QP threshold.

6. A computer system comprising:
   a video coder for coding video signals received by the computer system; and
   an advanced prediction (AP) decision logic coupled to said video coder for determining whether to enable or disable said AP mode in said video coder for a given frame.

7. The computer system of claim 6 wherein said AP decision logic further comprises a quantization parameter (QP) mean generator for generating a QP mean for a first frame.

8. The computer system of claim 6 further comprising an AP comparator for comparing said QP mean with a predetermined QP threshold, said AP mode is turned on if said QP mean is greater than said predetermined QP threshold and said AP mode is turned off if said QP mean is less than or equal to said predetermined QP threshold.

9. An apparatus for adaptively enabling and disabling an advanced prediction (AP) mode of a video coder for video data processing comprising:
   means for generating a QP mean for a first frame; and
   means for comparing said QP mean with a predetermined QP threshold, said AP mode is turned on if said QP mean is greater than said predetermined QP threshold, and said AP mode is turned off if said QP mean is less than or equal to said predetermined QP threshold, said means for comparing coupled to said means for generating.

10. A computer system comprising:
    means for coding video signals received by the computer system; and
    means for determining whether to enable or disable said AP mode in said video coder for a given frame, said means for determining coupled to said means for coding.

11. The computer system of claim 10 wherein said means for determining further comprises means for generating a QP mean for a first frame.

12. The computer system of claim 10 further comprising means for comparing said QP mean with a predetermined QP threshold, said AP mode is turned on if said QP mean is greater than said predetermined QP threshold and said AP mode is turned off if said QP mean is less than or equal to said predetermined QP threshold.

* * * * *